United States Patent Office 2,740,833
Patented Apr. 3, 1956

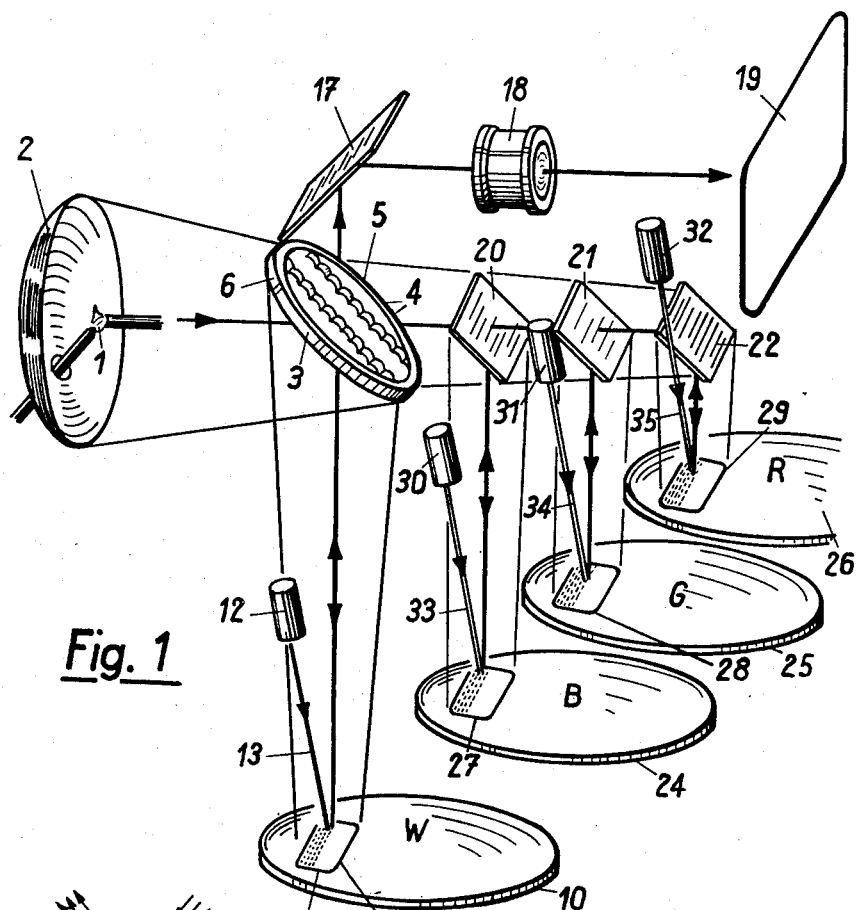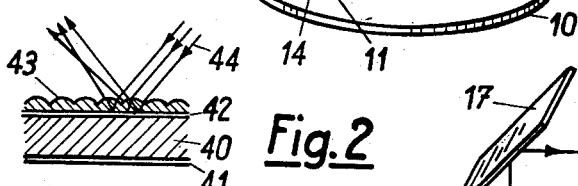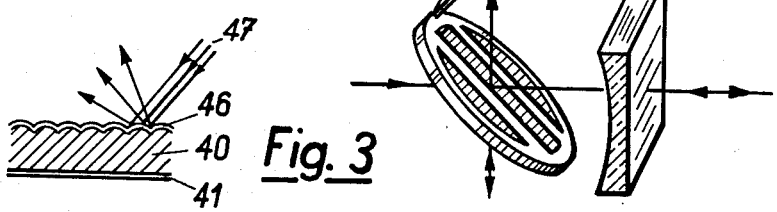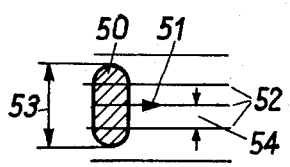

2,740,833

APPARATUS FOR SIMULTANEOUS PROJECTION OF A PLURALITY OF IMAGES COMPOSING A TELEVISION IMAGE

Edgar Gretener, Zurich, Switzerland

Application August 14, 1953, Serial No. 374,184

Claims priority, application Switzerland August 16, 1952

11 Claims. (Cl. 178—5.4)

The present invention is related to an apparatus for simultaneous projection of a plurality of images composing a television image.

Such apparatus for the simultaneous projection of the several constituent pictures composing a television picture have e. g. been described in my copending application Serial No. 245,024 filed September 4, 1951. They consist of a light source with illumination system, a mirror bar system, at least one concave mirror with a control medium spread over it, a projection lens and at least one cathode-ray tube. For the purpose of controlling the light flux originating from the light source, local alterations of the control medium varying from point to point are produced by means of the cathrode ray at the spots corresponding to the constituent pictures. The upper sides as well as the lower sides of the bars of the mirror bar system are given reflecting surfaces so that the light from the light source impinging upon the bars as well as the light passing through the slits is utilized for illuminating the constituent pictures generated on the concave mirror by the cathode-ray. Alternatively one common or several separate concave mirrors may be provided for the constituent pictures.

As has been explained in my above identified application, such apparatus may be employed for the projection of color television images which are obtained by superimposition of one black-and-white and three coloured component pictures.

The present invention envisages to improve the efficiency of such apparatus. According to the invention it is characterized by the feature that for the purpose of reducing the accuracy of register required when superimposing said pictures, the coloured constituent pictures have reduced sharpness with respect to the white-and-black picture.

Embodiments of the present invention will be explained in detail in the following with the aid of the accompanying drawings.

Fig. 1 shows in schematic perspective representation such an apparatus which utilizes the principles of the present invention.

Figs. 2 and 3 represent a section of the design of the bar system of Fig. 1 and

Fig. 4 serves to explain electrical measures utilized for carrying out the invention.

Fig. 5 shows a modification of Fig. 1.

As shown in Fig. 1, the light of light source 1, according to representation of an arc lamp, impinges upon a bar system through the intermediary of concave mirror 2, the bars 4 being given a reflective layer on the upper surface 5 as well as on the lower surface 6.

The light reflected downwards by the lower reflecting surface of the bars impinges upon concave mirror 10 which is so arranged that its centre of curvature coincides with the centre of symmetry of the lower surface of the bar system. As has been explained in my above mentioned application, the bar system is thus imaged upon itself by the concave mirror. The light reflected by concave mirror 10 is thus redirected to the light source by the reflecting surface 6 of the bar system. The control medium is spread over the surface of concave mirror 11 in a thin layer and is scanned within the rectangular image field 11 along lines 14 by the cathode-beam 13 generated by the cathode ray tube 12. By suitably modulating the cathode-beam by the video signal a very fine raster is produced on the surface of the control medium. The period (pitch) of this raster is constant, whereas its amplitude is proportional from point to point to the brightness of the image to be reproduced. In general the point-to-point alteration of the control medium is not effected by intensity-modulation of the cathode beam, but by the velocity modulation. A H-F A. C. voltage of constant frequency is superimposed upon the deflection voltage effecting the line-scanning movement of the electron beam, whereby raster shaped deformations are produced on the surface of the control medium as described above. Thereby the light deflected by the mirror is deviated to varying degree for the different points of the image field, so that it may pass upwards through the slots between the bars of the bar system. It impinges upon the deflection mirror 17 and through a lens 18 reaches the projection screen 19. Lens 18 is so arranged that it images field 11 upon screen 19.

The light passing through the slits of system 4 impinges upon a color filter set composed of dichroic mirrors 20 and 21 and a plain mirror 22. Thereby the white light generated by the light source is split into colored light beams the color of which each corresponds to one of the primary colors of the employed color reproduction system respectively. In general blue, green and red are employed as primary colors. The transmission characteristics of fibers 20 and 21, by way of example, are so selected that mirror 20 reflects blue light, but transmits green and red, whereas mirror 21 reflects green (and blue) light and transmits red light. As the planes of dichroic mirrors 20 and 21 and of mirror 22 are inclined to the direction of impinging light, the separated colored light beams are reflected downwards. Each impinges upon an appertaining separate concave mirror 24, 25 and 26 which are mounted in similar manner as concave mirror 10. Concave mirror 25, 25, 26, and the dichroic mirrors 20 and 21 and mirror 22 are so arranged that a virtual image of the centre of the reflecting surface 5 of mirror bar system 4 is formed at the center of curvature of concave mirror as seen from each of the mirrors. The colored beams of light thus generated serve to illuminate image fields 27, 28 and 29, which, according to representation correspond to the color component images for blue, green and red, and which are separately scanned by cathode beams 33, 34 and 35 generated by cathode ray tubes 30, 31 and 32. The color component images generated on the image fields 27, 28 and 29 must furthermore be so arranged on the concave mirror means that their boundaries coincide as seen from the center of the projection lens 18, and will thus coincide on the screen 19.

It is well known that in the case where reconstitution of the colored picture is effected by a black-and-white and several colored component pictures, the "black-and-white" picture is relevant for the sharpness of the composite picture. On the other hand considerably reduced requirements exist as regards the sharpness of color component images as long as those images are in register in their gross details. This fact is utilized with the purpose of reducing requirements of accuracy of register when superimposing the color component images.

With a projection apparatus according to the present invention as described above the color component images for the purpose of reducing the required accuracy of register have a reduced sharpness with respect to the black-and-white picture. Thus the frequency band required for transmission can be reduced as only the black-and-white picture is transmitted with a frequency band corresponding to the desired resolution (number of image points) of reproduction, whereas the frequency band required for the color component images is considerably lower with regard to their reduced sharpness.

If a transmission system is employed with reduced frequency band, the black-and-white picture and the colored pictures will still be scanned with identical number of lines, in order to avoid unnecessary complication of the devices for line deflection of the cathode ray, etc. With regard to this unchanged number of lines a certain strip-structure of the image along the lines may show. Means are therefore employed, which reduce the sharpness of the color component images in a direction normal to the lines. For this purpose optical means as well as purely electrical means may be employed. With the apparatus shown by Fig. 1 the sharpness of the image is reduced by optical means. For this purpose the reflecting surface of the bar system has applied to it a cylindrical lens raster, i. e. dispersing in only one direction. As is shown in Figs. 2 and 3, by way of example by inserting a cylindrical dispersing raster of transparent material or by suitably shaping, e. g. goffering the reflecting surface. The rasters are so oriented that the dispersion is only effective at right angles to the scanning lines.

Fig. 2 shows a section through a bar system where an additional dispersion raster is applied to the reflecting surface. Bar 40 has applied reflecting layers 41 and 42 to its lower and upper surface. A dispersing raster 43 of transparent material, e. g. glass, is applied to the upper bar surface 42. The dispersing raster is cylindrical, the cylinder axes being at right angles to the plane of the drawing so that an impinging light beam 44 is dispersed only in this plane. With the arrangement of Fig. 3 the reflecting surface of the upper bar 46 itself is rastered and effects dispersion of the impinging beam 47 in the same manner as with Fig. 2.

Furthermore it is possible to insert a cylindrical dispersing lens 36 into the optical path of the color component images instead of goffering upper surface 5 of the bar system. The essential parts of this modification have been shown in Fig. 5. Such a lens disperses in only one direction, i. e. at right angles to the cylinder axis and in this manner again effects a certain "smearing" of the color component image at right angles to the lines.

With the embodiment shown in the drawing, a dispersing raster disposed on the bar system, viz. an optical means, is employed to reduce the sharpness at right angles to the lines. A similar effect may be achieved electrically if the dimensions of the scanning spot are increased in direction at right angles to the lines. Adjacent lines will then overlap on the control medium which again causes "smearing" i. e. a reduction of the sharpness at right angles to the lines.

This has been schematically represented in Fig. 4. The scanning spot 50 is led across the image field in direction of arrow 51 along lines 52. The width 53 of the spot is several times larger than the distance 54 between the scanning lines 52. As has already been mentioned the raster generated on the control medium by the cathode ray has the form of a periodic modulation. Attention must be paid therefore when increasing the width of the scanning spot at right angle to the lines that the periodic modulations of adjacent lines are in phase. In contradistinction if the periods of adjacent lines are shifted they do no longer superimpose correctly and cause a flattening of the control characteristic of the apparatus. In case of "opposition of phases" total fading may occur.

By increasing the width of the spot the sharpness of the image is reduced in direction normal to the scanning lines, i. e. the lines are smeared normal to their direction. If a bar system with rastered surface is employed, this "smearing" is thus effected by purely optical means. On the other hand in case of increasing the width of the scanning spot according to Fig. 4, smearing is already effected when the control medium is acted upon by the cathode ray.

Such an apparatus offers a number of important advantages. By the reduced sharpness of the color component images requirements regarding accuracy of register of the individual images are considerably reduced. If errors of register occur, either no color fringes will appear or the intensity of such color fringes is so low due to the reduced sharpness that they will not cause any disturbances.

With regard to the reduced frequency band a corresponding reduction of the fineness of the raster serving for light control is admissible; consequently the frequency of the alternating current modulating the cathode ray required for producing the raster may be reduced. At the same time the size of the scanning spot may be increased in direction of the lines. Broadening of the spot without reduction of the modulation frequency is not admissible, as a substantial increase of the spot with unaltered frequency impairs the light control action the efficiency of which depends upon the ratio of both factors. By increasing the size of the spot the requirements as regards beam concentration of the cathode ray tube are considerably reduced and at the same time a reduction of the beam density on the control surface is obtained which on the other hand increases the life of the Eidophor liquid. These advantages are still increased by employing electrical means for reducing the sharpness at right angles to the lines, i. e. increasing the spot in this direction. Furthermore by reducing the frequency of the modulating current a reduction of the current consumption of the device for modulating the cathode ray is achieved.

If the frequency of the A. C. modulation voltage of the color component images is reduced, this causes an alteration of the characteristic of light control, i. e. of the relation of signal size and brightness. With regard to the non-linear characteristic of the above described light control process it is however possible to employ linearizing amplifiers. They will distort the signals serving to control the cathode ray in such a manner that the non-linearity of the characteristic of light control is just compensated and a linear relationship between signals and brightness is obtained. The linearizing amplifiers for the color component images may be laid out with respect to the above mentioned alteration of the characteristic.

The reduction of sharpness of the color component images reduces requirements as to register of the images on the screen. As has already been mentioned, it is desirable to take steps in order to ensure register of the contours of the images with a certain precision. Register errors, however, may occur if the line rasters of the color component images are not identical, but distorted with respect to each other. Such distortions are effected particularly by magnetic stray fields which effect the individual electron beams of the color component images. For this purpose the arrangement of cathode ray tubes is made as symmetrical as possible with regard to such disturbing fields. In order to eliminate disturbances by the magnetic earth field, the axes of the individual cathode-ray tubes are made parallel to each other as has been schematically indicated in Fig. 1. The disturbing influence of the magnetic field thus affects all cathode rays in identical manner and relative distortions are avoided.

In order to shield off powerful extraneous magnetic fields which by ways of example are generated by the arc current of the light source, all tubes are advantageously mounted within a common shield. In order to avoid that residues of the disturbing fields may still be effective within these shields, the cathode ray tubes are preferably so arranged within the shield, that the disturbing influence of these residue fields is again identical for all cathode ray tubes.

I claim:

1. Apparatus for the projection of colored television pictures by superimposing simultaneously the black-and-white and three color component pictures on a screen; said apparatus comprising a light source with an illumination system, a mirror bar system having reflecting surfaces on both sides of the bars thereof, concave mirror means having thereon a control layer and having an individual picture area for each component picture, a projection lens, cathode ray means developing spots scanning said picture areas to impart thereto point-to-point variations in the control layer in correspondence with the appertaining component picture signals, optical means located between said mirror bar system and said concave mirror means for deflecting to said picture areas light striking the bars of and light passing between bars of said mirror bar system; said optical means developing for each picture area a virtual image of said mirror bar system with its center substantially coinciding with the center of curvature of the associated picture area and superposing the said picture areas in register as viewed from the projection lens, whereby light incident upon said control layer at points contacted by cathode rays is directed through said mirror bar system to said projection lens, and means reducing the sharpness of the color component pictures with respect to the white-and-black picture, whereby the requirements of accuracy of register of the superimposed pictures are reduced.

2. Apparatus according to claim 1, wherein the color component picture signals have reduced frequency bandwidth with respect to the black-and-white component, and wherein said sharpness reducing means comprise optical means for reducing the sharpness of the color component pictures in a direction normal to the scanning lines.

3. Apparatus according to claim 2, in combination with means for superimposing H-F A. C. modulation voltages upon the several cathode-beams the modulation means which superimposes a voltage on the cathode beams developing the color component pictures being of lower frequency than the modulation means which superimposes a modulating voltage on the cathode beam which develops the black-and-white picture, whereby the fineness of the raster of said color component pictures is reduced in correspondence with the reduction of sharpness thereof.

4. Apparatus according to claim 3, wherein the spots developed by the cathode ray means scanning the color component pictures are substantially broader in direction of the scanning lines than the spot developed by the cathode ray means scanning the black-and-white picture.

5. Apparatus according to claim 2, wherein the reflecting surface of the mirror-bar system disposed in the light path of the color component pictures has a dispersing effect in a direction normal to the lines of scanning.

6. Apparatus according to claim 5, wherein an additional dispersing raster is applied to said reflecting surface.

7. Apparatus according to claim 5, wherein a reflecting surface itself is goffered to form a dispersing raster.

8. Apparatus according to claim 2, in combination with a cylindric dispersing lens disposed on the light path of the color component picture and to reduce the sharpness of color component pictures in direction normal to the scanning lines.

9. Apparatus according to claim 2, wherein the spot developed by each cathode ray means scanning the color component pictures is substantially broader in direction normal to the lines than in direction of lines.

10. Apparatus according to claim 2, wherein said cathode ray means comprises a cathode-beam tube for each picture area, the axes of all cathode-beam tubes being disposed parallel to each other.

11. Apparatus according to claim 10, wherein the cathode-beam tubes are disposed within a common shield whereby the disturbing influences of the residual field still existing within the shield act in an identical manner upon all cathode-beams.

References Cited in the file of this patent

UNITED STATES PATENTS

| | | |
|---|---|---|
| 2,630,485 | Heikes | Mar. 3, 1953 |
| 2,634,327 | Sziklai | Apr. 7, 1953 |
| 2,672,502 | Albright | Mar. 16, 1954 |